INVENTORS
M. YOSHIMURA, T. TAKADA and S. TANAKA
BY
ATTORNEY

FIG. 11
FIG. 12
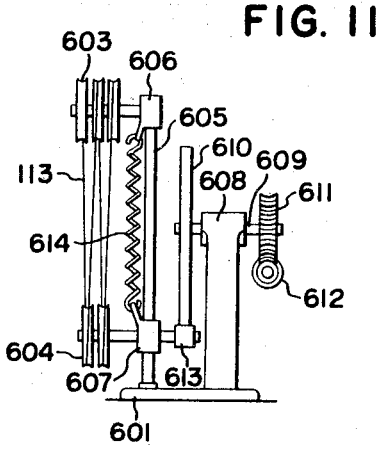
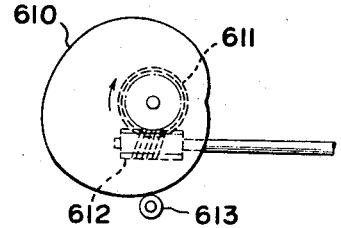
FIG. 13 a
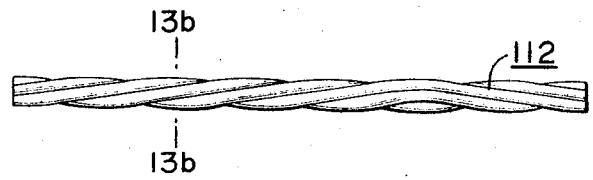
FIG. 13 b
FIG. 14 a
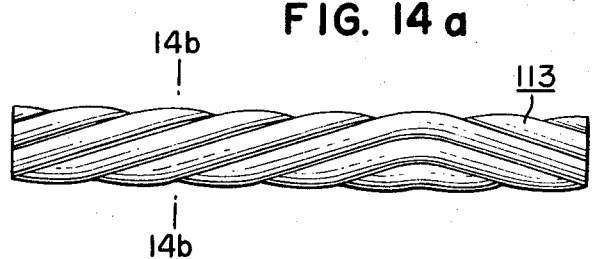
FIG. 14 b

United States Patent Office 3,507,108
Patented Apr. 21, 1970

3,507,108
METHOD OF PRODUCING S–Z ALTERNATING TWISTS AND THE APPARATUS THEREFOR
Masamichi Yoshimura, Tokyo, Toshihisa Takada, Sakurashi, and Shigenobu Tanaka, Tokyo, Japan, assignors to The Fujikura Cable Works Limited, Tokyo, Japan, a corporation of Japan
Filed Feb. 17, 1966, Ser. No. 528,129
Claims priority, application Japan, Mar. 1, 1965, 40/11,758
Int. Cl. H01b 13/04
U.S. Cl. 57—34                                11 Claims

ABSTRACT OF THE DISCLOSURE

The invention relates to a method and apparatus for producing alternately twisted wires by rotating two spaced twisting heads at the same speed and in the same direction and advancing the plurality of wires passing through the twisted heads at two different linear speeds repeated alternately, the arrangement being such that upstream and downstream of this twisting process other processes may be easily adopted to provide a continuous process for forming a cable from pairs or quads of twisted wire.

---

The present invention relates to a method and apparatus for producing an S–Z alternating strand, i.e., the strand having S-twisted or right hand twisted portion and Z twisted or left hand twisted portion alternately in the length wise direction, and the apparatus therefor. In particular, the present invention relates to the method and the apparatus which comprises means for advancing a plural number of insulated wires to be stranded, means for passing the said wires in a bundle through the cradle which rotates in one direction, means, as provided within the said cradle, for retaining a predetermined length of the said insulated wires, and means for changing the take up speed of the said insulated wires.

In producing a communication cable composed of pairs or quads of insulated wires, or in order to form cable core by combining units, conventional methods require that either supply unit or take up unit must be revolved. According to certain prior art methods, the process for providing pairs or quads of twist wires is done in one operation and the process for forming a cable therefrom is done in a separate and independent process requiring additional storage and pay-off reels and equipment. In such methods, the supply section containing the reels or bobbins wound with the insulated wires or pairs, or quads, or units to form the cable are heavy and large as well as the stages for supporting those reels, the winding section containing the take-up device for the pairs or quads, units or cable core is also heavy and bulky, with the result that it is difficult to increase the twisting and/or take-up of the apparatus.

Improvements have been made in the methods and apparati for the production of S–Z alternating twist cables. In one such system, the desired number of insulated wires, pairs or quads, or units are individually separated and passed through a face plate, which is rotated to the right and left alternately, whereby an S–Z alternating twist is given to the wires. According to this prior method it is not necessary to carry out the rotation for twisting the winding portion of the twisted wires or the supplying portion of a plural number of wires to be twisted, so that it is possible to carry out several steps of twisting processes from a plural number of untwisted wires through pairs or quad twisting to cable cores. However, according to that method, the wires to be twisted are tangled because of the twisting thereof by the rotation of the face plate before they pass the face plate. Therefore, the rotational angle of the face plate is at most 540° or so in one or the other direction, so that the reversing rotation must be repeated over again, making it difficult to increase the running speed of the wires to be twisted.

According to another conventional method for producing S–Z alternating twisted wires, a cradle is rotated alternately to the right and left passing a bundle of a plurality of wires, which advanced through two fixed heads and two twisting heads provided between the two fixed heads and at both sides of the storing means within the cradle. The fixed head is a wire holding device such as a set of pinch rolls or a set of sheaves in which the wire is free to run but restricted to the direction of rotation around the wire axis. According to this method, it is possible to continue the rotation of the cradle in one direction while the length of wires is fed into the storing means. According to this conventional method, the running speed of wire can be increased when compared with the former conventional method wherein the face plate is rotated to the right and left alternately. Thus according to this method, although the running speed of the wire is greatly increased, and the cradle is rotated at higher speeds the cradle must be reversely rotated at a certain cycle, with the resultant deterioration of the rotation portions.

In a telephone cable it is frequently necessary to take out branch wires for new subscribers from the installed cables or overhead wires, making it necessary to provide readily accessible terminals in the installed wire network to service these new subscribers. In addition, a small amount of excess length is necessary in a cable conductor, so that, with the cable installed, easy access for making service connections is possible. In such cases, particularly when overhead wires have been installed under tension with very little slack, it is very difficult to have wires of sufficient length for connecting branch service lines or for fixing readily accessible terminals. It is difficult to take out optional pairs or quads from the cable and almost impossible from the central section of an installed telephone cable. In order to simplify installation of branch service lines or readily accessible terminals, S–Z alternating twisted wires have been developed to provide sufficient length of wires for carrying out such installations by the simple expedient of untwisting the required wires at their reversely twisted portions.

One of the objects of the present invention is to provide a method and apparatus for improving S–Z alternating twisted wires in which a cradle is rotated in one direction only without the cyclical reverse rotational requirements of prior art methods and apparati, and in which optional twisting turns without the restriction as to the number of turns of the twist by the adjacent reversing points may be made.

Another object of the present invention is to prevent the effect of changes in the running speed of wires within the cradle from being imparted to the capstan and the take up device by providing a speed-changing device for the wires before the S–Z alternating twisted wires enter the capstan.

Another object of the present invention is to limit the portion, where the running speed of wires is changed, to be only that portion of the wires running within the cable and to eliminate the effect of the change of the running speed of the wires from being imparted not only to the other portions such as the capstan and the take up device but also to supplying device by providing the speed changing device for wires before and as well as after the cradle.

The present invention will now be more clearly described in connection with illustrating embodiments shown in the accompanied drawing in which:

FIG. 11 is a side view which shows an embodiment of the device for changing the speed of the wires or strands, as employed in FIG. 8;

FIG. 12 is a front view of the cam device portion in the speed changing device as shown in FIG. 11;

FIG. 13a is a front view of the S–Z alternating twisted quads as produced by means of the method and the device of the present invention;

FIG. 13b is a cross sectional view taken along the 13b—13b of FIG. 13a;

FIG. 14a is a front view of the S–Z alternating twisted units composed of 5 quads as shown in FIG. 13a; and FIG. 14b is a cross sectional view taken along 14b—14b of FIG. 14a.

Figure 1:
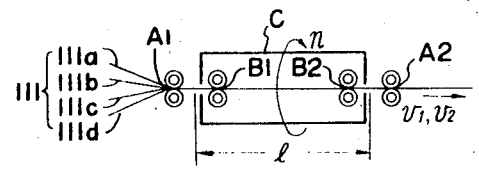
FIG. 1 is a front view of the diagram which shows the principle of the present invention.

The basic principle of the method for producing S–Z alternating twisted wires of the present invention may be ascertained from FIG. 1, in which two fixed heads $A_1$ and $A_2$ and through two twisting heads $B_1$ and $B_2$ provided therebetween are illustrated, a plurality of wires 111, i.e. 111a, 111b, 111c, and 111d, being passed through the beads in the order of $A_1$, $B_1$, $B_2$ and $A_2$, while the twisting heads $B_1$ and $B_2$ are rotated in a predetermined direction, and the running speed of the said wires 111 being changed.

In the present invention, the distance between the first fixed head $A_1$ and the first twisting head $B_1$, and the distance between the second twisting head $B_2$ and the second fixed head $A_2$ are made so small they may be ignored when compared with the distance between the first twisting head $B_1$ and the second twisting head $B_2$. The distance between the first fixed head $A_1$ and the second fixed head $A_2$ is set to be $l$ (hereinafter referred to as the storing length); the wire running speed is changed from $V_1$ to $V_2$ and from $V_2$ to $V_1$, alternately; wire the revolution per unit time of the cradle C which supports the first and second twisting heads $B_1$ and $B_2$ is set to be $n$. The change of the running speed of the wires 111 from $V_1$ to $V_2$ or $V_2$ to $V_1$ is not gradually or smoothly conducted, but is carried out abruptly; the wires 111 not being shortened by the twisting thereof.

When the wires 111 run through each of the said heads $A_1$, $B_1$, $B_2$ and $A_2$ with the velocity of $V_1$, the number of twists imparted to the unit length of the wires 111 by means of the first fixed head $A_1$ and the first twisting head $B_1$ is $n/V_1$. When the portion of the wires 111 to which the number of twists $n/V_1$ is given, has arrived at the second twisting head $B_2$ or the second fixed head $A_2$, in other words, when the wires 111 are advanced as much as the storing length $l$, the speed is then changed to $V_2$, the number of twists imparted to the unit length of the wires 111 by the second twisting head $B_2$ and the second fixed head $A_2$ becomes $-n/V_2$, and is overlaid with the number of twists $n/V_1$ as previously given. As a result thereof, the number of twists $n/V_1-n/V_2$ is given to the wires 111. At the same time, with the linear speed of the wires now $V_2$, the number of twists per unit length as given to the wires 111 by the first fixed head $A_1$ and the first twisting head $B_1$ is $n/V_2$ and when this second portion has arrived at the second twisting head $B_2$ or the second fixed head $A_2$, the linear speed of the wires is changed to $V_1$. The number of twists per a unit length as given to the wires 111 is now $n/V_2-n/V_1$.

By repeating the said steps over again, the wires 111 are made into S–Z alternating twisting strand having S-twist portion and Z-twist portion having $|n/V_1-n/V_2|$ of the number of twists per a unit length for each length of $l$.

In the foregoing explanations, the running speed of the wires 111 is changed every storing length $l$, but it can also be changed at every storing length $l$ divided by an odd number. However, in case it is changed at every storing length $l$ divided by an even number, it is impossible to obtain S–Z alternating twisted wires because the twists given between the first fixed head $A_1$ and the first twisting head $B_1$ are untwisted to the original state between the second twisting head $B_2$ and the second fixed head $A_2$.

Figure 2:
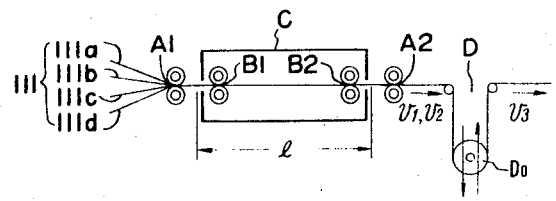
FIG. 2 to FIG. 6 are the front views of the diagrams which show illustrative embodiments, respectively based on the principle of the present invention.

FIG. 2 shows an embodiment of the present invention wherein by providing the speed changing device D for wires downstream of the cradle C of FIG. 1, the running speed of the strands passing through the said heads can be changed. The wires downstream of the speed changing device D is always taken up at a constant speed so that the speed of the capstan and the take-up device having a large rotating inertia is not changed.

When each individual wire of the wires 111, i.e., 111a, 111b, 111c, and 111d is, in a bundle, passed through each of the heads $A_1$, $B_1$, $B_2$ and $A_2$, in order to change the running speed thereof into $V_1$ or $V_2$, the wires are taken into the speed changing device D at the speed of $V_1$ and then the said wires are taken out therefrom at the speed of $V_3$, or the said wires are taken in at the speed of $V_2$ and taken out at the speed of $V_3$, the capstan and the take-up device taking up the said wires always at the speed of $V_3$.

Now, when the speeds of the said wires are respectively set to be $V_1 > V_3 > V_2$, and the pulley $D_0$ of the speed changing device D is moved up and down, in order to have the wires 111 taken into the speed changing device D at the speed of $V_1$, and have the wires taken out therefrom at the speed of $V_3$, the said pulley $D_0$ must be lowered at the speed of $(V_1-V_3)/2$. Also, in order to take in the wires 111 into the speed changing device D at the speed of $V_2$, and to take out the same at the speed of $V_3$, the pulley $D_0$ must be elevated at the speed of $(V_3-V_2)/2$. In this case, the time $t_1$ required for the wires 111 to be proceeded by the storing length of $l$ is $l/V_1$, and the time $t_2$ required for the said wires 111 to be proceeded by the distance of $l$ at the speed of $V_2$ is $l/V_2$. From the hypothesis of $V_1 > V_2$, it is necessary to have the time $t_2$ required for elevating the said pulley $D_0$ become longer than the time $t_1$ required for lowering the said pulley $D_0$ and in this case the displacement of the up and down movement of the said pulley is $l/2 \cdot (V_1-V_2)/(V_1+V_2)$.

Figure 3:
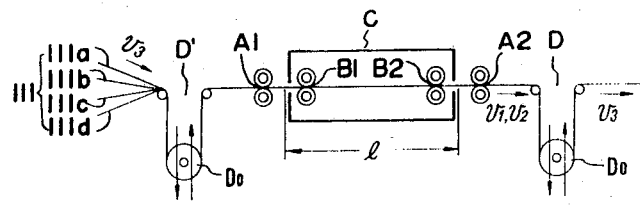

FIG. 3 shows the case where the speed changing devices D and D' are provided down stream and upstream, respectively, of the cradle C, and the portion alone, where the wires 111 are passed through the cradle C is made to be affected by the speed change, and the wires on the take out side and take up side are made to run at a constant speed. In this case, the operation of the speed changing device D is the same as explained in FIG. 2, but the operation of the speed changing device D' provided upstream of the cradle C is the reversal of the operation of the speed changing device D.

Figure 4:
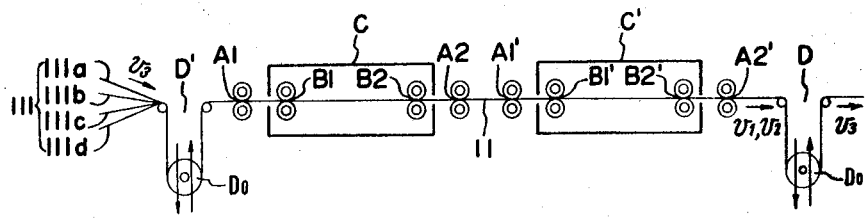

FIG. 4 shows the case where two sets of the devices each of which is composed of the cradle containing two twisting heads and two fixed heads provided on both sides of the twisting heads are provided in seriation between two speed changing devices D and D'. In other words, the device composed of the cradle C which contains the two twisting heads $B_1$ and $B_2$ and the two fixed heads $A_1$ and $A_2$ provided on both sides of the said cradle C; and the device composed of the cradle C' which contains the two twisting heads $B'_1$ and $B'_2$ and the two fixed heads $A'_1$ and $A'_2$ provided on both sides of the said cradle C', are serially provided between the speed changing devices D and D'. In this case the two sets of devices provided are identical, and second fixed head $A_2$ and the first fixed head $A'_1$ are closely spaced. It is possible to produce the same S-Z alternating twisted wires as in the previous embodiments with the cradles rotating at only half the speed of the cradle, for example, in FIG. 3, with the rotational speeds of the cradles C and $C^1$ equal and opposite.

Figure 5:
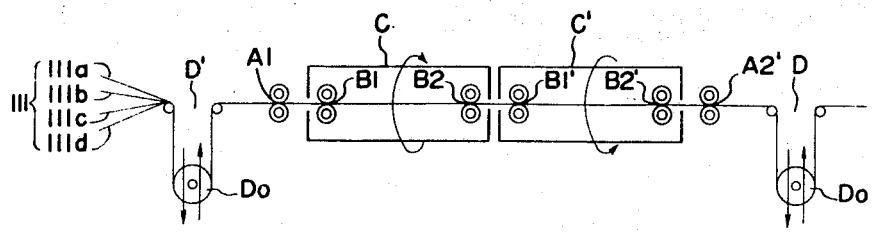

FIG. 5 shows a modification of FIG. 4, wherein the second fixed head $A_2$ on the side of the cradle C and the first fixed head $A'_1$, on the side of the cradle C' as shown in FIG. 4 are omitted, and the direction of the rotation of the cradle C and that of the cradle C' are opposite to each other. According to this method, it is possible to produce the same S-Z alternating twisted wires as can be obtained by means of the method shown in FIG. 4. It will be further understood that in the embodiments shown in FIG. 4 and FIG. 5, the respective rotation speeds of the said two cradles C and C' may be the same or different.

Figure 6:
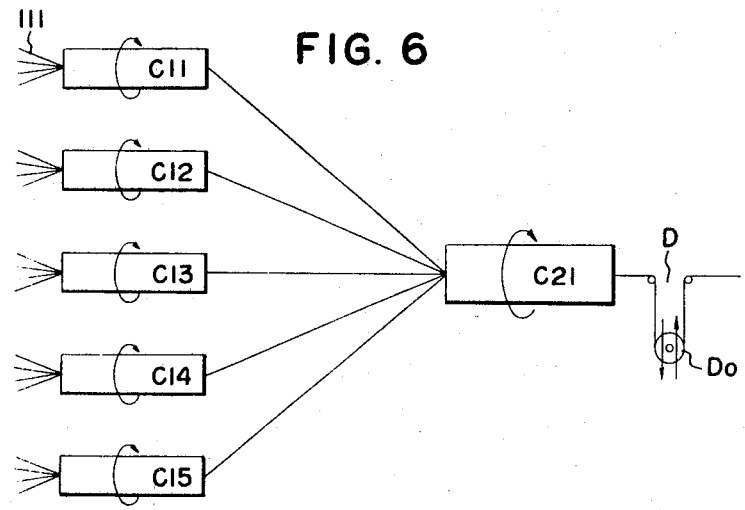

FIG. 6 shows an embodiment wherein the quads given S-Z alternating twists in accordance with the method of the present invention are given S-Z alternating twists to form a unit or cable in a continuous process. Illustrated are twenty individual wires divided into five groups each group thereof being composed of four individual wires, 111a, 111b, 111c, and 111d, and each group is twisted by the five cradles $C_{11}$, $C_{12}$, $C_{13}$, $C_{14}$ and $C_{15}$ respectively. The cradles are provided at least with two twisting heads having the storing means between two fixed heads. Five quads given of S-Z alternating twists after having passed through the said five cradles, are inserted, in a bundle into another cradle $C_{21}$. The cradle $C_{21}$ has the same structure as the cradle for forming the said quads. The unit given of S-Z alternating twists which composed of five quads after having passed through the said cradle is taken up through speed changing device D. The speed changing device D is the same as that described in accordance with FIG. 2, and by imparting repeatedly the two kinds of speeds $V_1$ and $V_2$ alternately to the wires, the S-Z alternating twisted quads produced by the first cradles $C_{11}$, $C_{12}$, $C_{13}$, $C_{14}$ and $C_{15}$ and then pass through the second cradle $C_{21}$, to produce a S-Z alternately twisted unit or cradle.

Here, the speed of the wires which pass through the first cradle and the second cradle is controlled by means of only one speed changing device. In such a case as this, it is preferably to set the relation between the storing length of the wires $l$ on the first cradle and the storing length of the wires on the second cradle $l'$ equal to each other.

Figure 7:
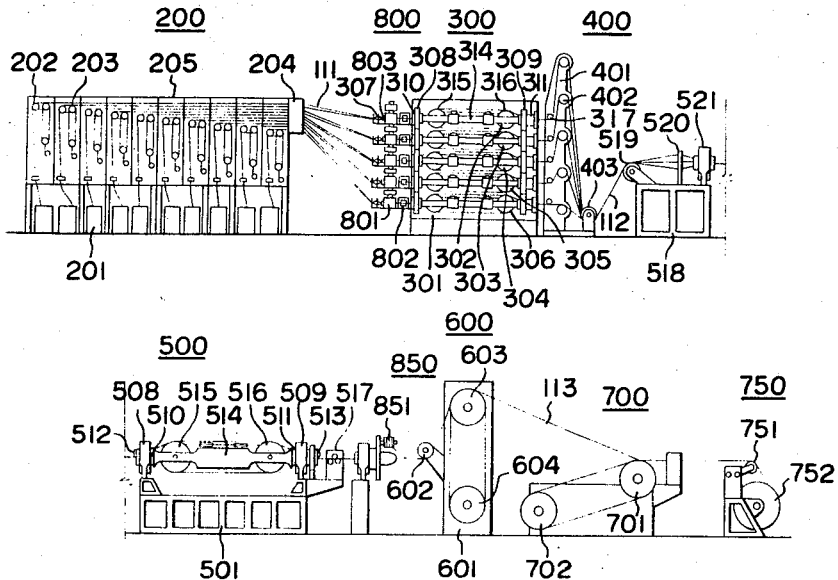
FIG. 7 is a front view which shows an embodiment of the whole processes for producing S–Z alternating twisted wires of the present invention.
Figure 8:
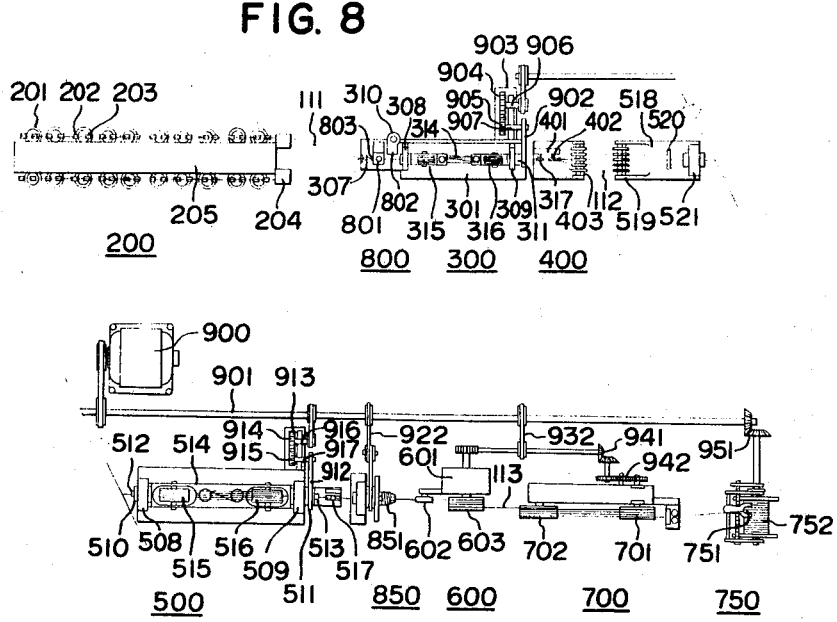
FIG. 8 is a plan view of FIG. 7.

Referring now to FIGS. 7 and 8, a production line is illustrated for producing five quads given S-Z alternating twists out of twenty insulated element wires, and for producing one unit of S-Z alternating twists by combining the five quads. In the figures, 200 is the supply stand of the wires such as insulated conductors, 300 is the first cradles, 400 is the device for having the reversing position of the twist of each quad not coincided, 500 is the second cradle, 600 is the speed changing device, 700 is the capstan, and 750 is the take up or winding device. Element 800 is the twist maintaining device, such as, an adhesive applying device, as arranged on upstream of the first cradle, 850 in the binding device such as strip-winding device as arranged downstream of the second cradle 500 and 900 is the driving force imparting device for imparting driving force to each of the whole devices.

The twenty wires, i.e., insulated conductors 111, as taken out from the supply stand 200 are divided into five groups of four each, and each of the groups has the wires combined into a bundle and passed through the adhesive applying device 800 and then is passed through respectively each of the first cradles 300, five of which are arranged in parallel, and thereby the five quads 112 given S-Z alternating twists are formed. Thereafter, the said five quads are passed through the device 400 which operates to have the reversing position of twists of each quad not coincided, and the reversing position of the twist of each quad is bundled and is passed into the second cradle 500. There the unit 113 S-Z alternating twists, as composed of five quads is formed, and the unit 113 having passed therethrough is immediately bound or clamped by a binding strip or the like by means of the binding device 850. Thereafter the unit 113 are wound up on the winding device through the speed changing device 600, and the capstan 700. There the capstan 700 pulls the unit at a constant speed, and by passing the unit through the speed changing device 600, the wires and the quads which pass through the first cradle 300 and the second cradle 500, respectively, are given two different speeds.

In the wire supplying device 200, 201 is the pail pack which contains the wires, 202 is a guide roll, 203 is the dancer pulley, 204 is an outlet guiding device, and these are supported by a supporting frame 205.

The wires 111 taken out of the pail pack 201 are passed through the guide roll 202 and are given a certain tension by means of the dancer-pulley 203, and from the outlet guiding device 204 each of the wires is then taken out to the first cradles 300. As herein illustrated, the wires 111 are contained in the pail pack 201, but in place of the pail pack the wires can be wound on a reel.

Adjacent the adhesive applying device 800 and the first cradle 300, 301 is the supporting frame, 302 to 306 are the five first cradles arranged in parallel and supported by the supporting frame 301, 307 is a face plate as provided upstream of the first cradles. The adhesive applying device 800 is provided between the first cradle 302 to 306 and the plate 307. The specific details of said first cradles and the adhesive applying device are shown in FIG. 9 and FIG. 10.

The adhesive applying device 800 is composed of the adhesive applying head 801 and the cooling fan 802. Element 803 is the entrance die of the said adhesive applying head 801. Each of said five cradles 302 to 306 of the first cradles 300 includes bearings 308 and 309 in which shafts 310 and 311 are mounted. In the shafts 310 and 311 are mounted guide pulleys 312 and 313 (FIG. 9). A shaft 314 is connected to the shafts 310 and 314 with the groups of pulleys 315 and 316 thereon to store the desired length of wires between the said guide pulleys 312 and 313. The shafts 310 and 311 are driven together in a definite direction at a constant speed. In FIG. 9 and FIG. 10, 317 is a guide pulley, supported by a supporting pole 401 which is given hereinafter.

Figure 9:
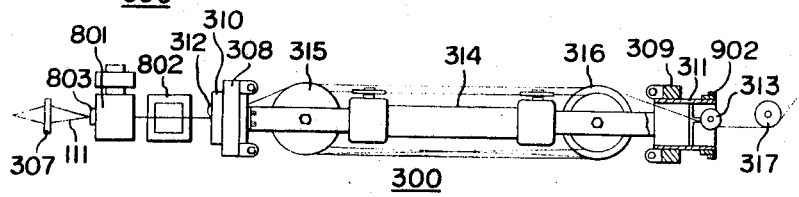
FIG. 9 is a front view which shows an embodiment of the rotary cradle having the storing means as employed in FIG. 7 and FIG. 8.
Figure 10:
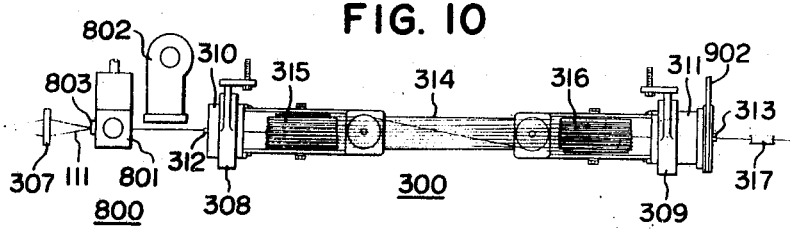
FIG. 10 is a plan view of FIG. 9.

When each of the components as shown in FIG. 9 and FIG. 10 is compared with each of the components as shown in FIG. 1, the entrance die 803 of the adhesive applying head 801 corresponds to the first fixed head $A_1$, and the guide pulley 312 within the shaft 310 on the inlet side of the first cradle 300 corresponds to the first twisting head $B_1$. The guiding pulley 313 within the shaft 311 on the outlet side corresponds to the second twisting head $B_2$, and the guiding pulley 317 corresponds to the second fixed head $A_2$.

The twenty wires 111 from the supplying device 200, are divided into five groups, each group being composed of four wires, and the wires of each group are arranged in place by means of the face plate 307 upstream of each cradle of the first cradles 300, are sent into the die 803, which is the equivalent of the first fixed head $A_1$, at an inlet angle which will not impart an unbalance of tension to the wires. Thus, the wires 111 are formed in quads and are passed through the adhesive applying head 801 and adhesive is applied thereon. By means of the cooling fan 802, the adhesive is cooled to be dried, and the thus treated wires are fed into each of the cradles 302 to 306 in the form of bundles of correct quad arrangement. In case polyethylene insulated conductors are used as the wires 111, a thermoplastic compound is used as the adhesive.

The wires 111 formed in quad after passing through the said adhesive applying device 800 are led to the center of the rotation of the shaft 310 by means of the guide pulleys 312, and are wound on the group of pulleys 315 and 316 for storing, and then by means of the guide pulley 313, the wires are guided out from the respective cradles 302 to 306 of the first cradles through the center of the rotation of the rotation shaft 311. The strands 111 are proceeded through the apparatus thus far described, at cradles 302 to 306 are rotated at a constant speed to twist four of the wires 111 before storing on the pulleys 315, 316 between the entrance die 803 and the guide pulley 312 within the shaft 310 at the entrance of the cradle. At the same time, the twists in the opposite direction are given to the four wires 111 between the guide pulley 313 within the shaft 311 at the outlet of the cradles and the guide pulley 317 supported by the supporting pole 401. The wires 111 are then guided out of the cradle. In this case, when the running speed of the wires 111 is constant and have passed through the cradles, the twists as given to the wires 111 at the entrance of the cradle are perfectly untwisted to the original state, and the twists are reduced to zero. Here, the most important operation of the present invention is carried out. In other words, in case the twisted portion of the wires 111 as twisted between the die 803 of the entrance portion of the cradle and the guide pulley 312 is fed between the guide pulleys 313 and 317 of the outlet portion of the cradle, in other words, the twisted portion of the wires 111 is moved as much as the storing length, the running speed of the wires 111 is abruptly changed to move the wires 111 at a constant speed different from the prior speed. This speed-change is repeated every time the wires are moved as much as the storing length. When the said operation is carried out as described above, the twists given to the wires at the entrance portion of the cradle, are turned reversally at the outlet portion of the cradle to be made into desirable twists or are further twisted in the opposite direction to be made into the desirable reversal twist of the opposite direction against the direction of the proceeding strands. The operation is equal to the operation as explained in FIG. 1, and is carried out by taking up the wires 111 at two different speeds (high and low) which is chanegable repeatedly by means of the speed changing device 600 for the wires as described hereinafter every time the wires 111 are moved through as much as the passage length of the strands (storing length) which is measured from essentially the intermediate of the die 803 and guide pulley 312 through the group of pulleys 315 and 316 to essentially the intermediate of guide pulleys 312 and 317, or the storing length divided by an odd number.

Each of the five quads 112 given S–Z alternating twists through the first cradle 300 is passed through the device 400 for having the reversed portion of the twists displaced from each other. The said device 400 is composed of the five guide pulleys 317 each of which provided on the supporting pole 401 at the posititon corresponding to each of the cradles 302 to 306, a group of guiding pulleys 403 guide the five quads 112, and the five guide pulleys 402 vary the passage length of each of the five quads 112 between the said guide pulleys 317 and 403. The passage length of each of five quads 112 from the first cradle 300 to the outlet of pulley group 403 is varied by means of the guide pulley 402 so that the portion of each quad to be reversely twisted varies from each other in the lengthwise direction when they are passing through guide pulley group 403. The variation in the portion to be twisted of each quad is necessary to prevent cross talk between guads and to improve the flexibility of the cable.

Each of the said five quads 112 is then led into the second cradle 500 in order to form S–Z alternate twisting unit. The second cradle 500 comprises a bearing 508 fixed on a supporting frame 501, and a bearing 509 supporting shafts 510 and 511 inside of which are provided guide pulleys 512 and 513. The shafts 510 and 511 are interconnected by a shaft 514 supporting a group of storing pulleys 515 and 516. On the supporting frame 501, a guide pulley 517 is provided downstream of the guide pulley 513 on the said outlet side. Upstream of the supporting frame 501 is provided a supporting base 518 as well as a guide pulley 519, a face plate 520 and a forming die 521.

It will be apparent that the second cradle 500 has almost the same structure as the first cradle 300 and the stored length of the strands (the quads 112) from the entrance side to the outlet side of the cradle is the same as the first cradles.

The five quads 112 produced by the first cradles 300 are moved separately forward to be arranged quad by quad in pentagnoal form by passing through the group of guide pulleys normal pentagon by passing through the group of guide pulleys 519 and through the face plate 520, and are guided through the forming die 521 at respectively equal inlet angles, and again combined to enter the guide pulley 512 on the entrance side of the cradle 500. The five bundled quads 112 are then passed through the guide pulley 513 through the group of pulleys for storing 515 and 516, and guided out from the guide pulley 517, the unit 513 giving the S–Z alternating twists required. At this time, the five bundled quads 112 are moved at the same speed and then at a second speed, the speeds being alternately cycled each time the five bundled quads 112 are moved a storing length of the cradle by means of the speed changing device 600.

As is apparent from the above description, at the second cradle 500, the forming die 521, the guide pulley 512 on the entrance side, the guide pulley 513 and the guide pulley 517 on the outlet side, correspond to the first fixed head $A_1$, the first twisting head $B_1$, the second twisting head $B_2$ and the second fixed head $A_2$, respectively.

The thus assembled unit 113 with S–Z alternating twists is then passed through the binding device 850, a binding member 851 such as cotton thread or plastic tape being provided to prevent the untwisting.

Then, the unit 113 is guided into the speed changing device 600. The device 600 is composed of a guide pulley 602 provided on a frame 601, the group of stationary pulleys 603 and the group of translatory pulleys 604. The unit 113 with the S–Z alternating twist is passed through the guide pulley 602, and is wound over the group of fixed pulleys 603 and the group of pulleys 604 and is then guided out therefrom, and taken up at a constant speed by means of the capstan 700. The group of translatory pulleys 604 are moved vertically in the particular embodiment illustrated herein to change in a cyclical manner the distance between the translatory pulleys and the stationary pulleys 603 for changing the linear speed of the strands, quads, and units. In other words, during the time when the group of translatory pulleys 604 are being moved away from the group of fixed pulleys 603, the strands run faster than the take-up speed of the capstan 700. During the time when the group of moving pulleys 604 are moving closer to the group of fixed pulleys 603, the running speed of the strands becomes slower than the take up speed, with the stationary and translatory pulleys paired and forming $m$ pairs as described in connection with FIG. 2, the decrease of the linear speed by the translatory pulleys, the increase in speed, and the distance of the up and down movement are $(V_1-V_2)/2m$, $(V_3-V_2)/2m$ and $l/2m \cdot (V_1-V_2)/(V_1+V_2)$, respectively.

An example of the speed changing device 600 is illustrated in FIG. 11 and FIG. 12. On a slide rod 605 perpendicularly erected on the frame 601, a block 606 is provided having the group of stationary pulleys 603 fixed thereto. A slide block 607 is provided on the rod 605, the translatory pulleys 604 being secured thereto. A tension spring 614 interconnects the two blocks 606 and 607, tending to move the slide block 607 upwardly on the rod 605. A bearing 608 is provided on the frame 601 having a shaft 609 rotatable thereon, a peripheral cam 610, and a worm gear 611 being secured to the shaft 609. The worm gear is rotated by a worm 612. A pin 613 provided in the slide block 607 engages the periphery of the cam 610 so that upon rotation of the cam the group of translatory pulleys fixed to the block are moved up and down on the rod 605.

The units are taken from the speed changing devices by the capstan arrangement 700, comprising two capstans 701 and 702, driven at a constant speed. The units are then wound on a winding drum having a traverser for the orderly winding of the units on the drum.

The driving mechanism for driving the first cradles 300, the second cradle 500, the binding device 850, the speed changing device 600, the capstan arrangement 700, and the winding device 750 is provided by means of a shaft 901 driven by a motor 900 as illustrated in FIG. 8.

The shaft 311 of the first cradle 300 is connected to the main shaft 901 through the gearing device 903 connected by means of the belt 902. The gearing device 903 is composed of the meshing gears 904 and 905 on shafts 906 and 907. The rotation of the shaft 311 is thus through the gears 904, 905 and the belt 902. The gear ratio of the gears 904 and 905 is determined by the required length of the twisting lay of the strands of the S–Z alternating twist.

The shaft 511 of the second cradle 500 is also connected to the main shaft 901 through the gearing device 913 by means of the belt 912, and driven in the same manner as the driving mechanism of the first cradle. Here, 914 and 915 are the gears, and 916 and 917 are the respective shafts therefor.

The binder 850 is driven by connecting the shaft thereof to the main shaft 901 by means of the belt 922.

The speed changing device 600 for the strands is driven by connecting the shaft of the worm 612 to the main shaft 901 by means of the belt 932.

The capstan arrangement 700 is driven by means of a gearing device 942 connected to the shaft of capstan 701 through a bevel gear 941 provided on the shaft of the worm 612. The gear ratio of the gearing device 942 is set up so as to have the capstan arrangement 700 pull out the length of the units 113 twice as long as the storing length of the strands on the cradles 300 and 500 when the cam 610 of the speed changing device 600 makes one rotation by means of the worm 612.

The winding device 750 is driven by connecting the traverser 751 and the winding drum 752 to the main shaft 901 through a bevel gear 951.

In the S–Z alternate twisting process, the adhesive applying device 800 is used to maintain the twist at the first cradles 300, and the binding device 850 at the second cradles 500 as described. According to the present invention, the series order illustrated and described may be altered according to need since the adhesive applying device or the binding device can be used at either the first cradle or the second cradle. Also, adhesive applying and bonding devices 800 and 850 can be provided at the right upstream or the right downstream of each cradle 300 and cradle 500.

Again, the fixing treatment for the wires or strands by means of the said devices 800 and 850 can be carried out throughout the whole length of the strands, but the fixing treatment can also be applied only to the portion where the twists of the units 113 or the quads 112 are reversely twisted, and by means of such treatment alone, the untwisting of twists can be sufficiently prevented. Also, in case the adhesive coating device is used as the twist controlling device, it is preferable that the coating operation is started a little before the running speed of the strands is changed into another running speed and intermittent operation should be carried out so that after the completion of reversal twisting the said operation may be stopped. Also, as the method for imparting the binding treatment to the strands, in case a binding member such as cotton yarn is employed as shown in FIG. 8 and FIG. 9, when the rotation of the binder is constant, the pitch of the binding member is altered to be either long or short depending upon whether the speed is fast or slow. Should the direction of the bind be counterclockwise, a bind of short pitch is given to the portion of the left hand lay twists of the unit, and a bind of long pitch is given to the right hand lay twists of the units.

In the concrete embodiment as shown in FIG. 7 to FIG. 10, two groups of pulleys are provided between the first and the second twisting heads as the means for storing the desirable length of the strands between the two twisting heads and the means for running the strands while being wound over the said two group of pulleys is provided. The two groups of pulleys can be replaced by an endless belt or caterpillar to make the strands run over the said endless belt or the caterpillar.

In the examples as shown in FIG. 7 and FIG. 8, the explanation is given about the case where the running speed of the strands at the time of the quad twist and the unit collection is changed only downstream of the second cradle. However, when the speed changing devices are provided downstream of the first and the second cradles, it is possible to optionally give the reversal periods of respective alternating twists of the quad-twist and unit collection. In this case, in order to compensate the difference between the running speed of the strands within the second cradles and the speed of taking out the strands from the speed changing device as provided downstream of the first cradles, it is recommendable to provide a dancer pulley. Further in case that too much tension is applied to the strands for pulling the strands throughout the whole process with a capstan, another intermediate tensioning capstan can be provided between the first and second cradles. Furthermore, it is possible to maintain constant speed of the strands guided out from the supplying device 200 by providing speed change devices upstream of the first cradles.

As is apparent from the foregoing, there is no restriction of the twisting rotation angle as in the conventional methods where the face plate is rotated to the right and left alternately, thereby providing high speed rotation in the use of the present invention. By changing the linear speed of the wires or strands as in the present invention and with each of the cradles rotating in only one direction it is possible to provide a faster operation than in conventional methods where the cradles are rotated first in one direction and then in the other direction alternately.

According to the present invention, it is also possible to provide overlayering of the S–Z alternating twists to the strands by arranging in series order a plurality of cradles. With the running speeds of the strands being higher, it is possible to give any desired twists to the strands, wires or quads, thereby improving the production thereof.

Furthermore, according to the present invention, it is not necessary to rotate the supplying side or the winding side for giving twists to the strands, and therefore in case the strands contained in the pail pack or bobbin on the supplying side are all taken up, or, in case the strands fill up the winding drum, a quick exchange of bobbin or winding drum may be made without stopping the operation of the apparatus. It is thus possible with the present invention to form wire or cable lengths of any desirable length in a continuous process without shutting down the apparatus for strand or wire supplies or winding drums.

While only certain embodiments of the invention have been disclosed, it will be readily appreciated that many modifications thereof may be made. It is, therefore, intended by the appended claims to cover all such modifi-

What is claimed is:

1. A method of producing alternate S and Z twists in a group of wires comprising the steps of passing the wires through a twisting set comprising two spaced fixed heads and two twisting heads arranged between the two fixed heads, each adjacent a respective one of the two fixed heads; rotating each of the twisting heads in one direction at the same constant speed, the wires being passed in a bundle through the first fixed head, first twisting head, second twisting head and second fixed head, and periodically changing the linear speed of the wires from one to the other of two different speeds each time the wires advance by a storing length equal to the distance between a point intermediate of the first fixed head and the first twisting head and a point intermediate of the second twisting head and the second fixed head divided by an odd number.

2. A method as set forth in claim 1, in which the wires are passed through a plurality of sets, each set consisting of two fixed heads and two twisting heads arranged therebetween, the set being arranged parallel to each other, and then passing the twisted wires from each of the said plurality of sets through one further set arranged in series to the plurality of the sets in a bundle, the storing length of all of the sets being equal.

3. A method of producing alternate S and Z twists in a group of wires comprising steps of supplying a plurality of wires and passing the wires through a plurality of twisting sets arranged in parallel and adjacent one another, each set comprising two fixed heads arranged downstream of the supplying means at a predetermined distance from each other, a cradle comprising two twisting heads arranged between the two fixed heads and each adjacent a respective one of the two fixed heads and storing means provided between the two twisting heads; rotating the cradles in one direction with a constant speed while periodically changing the linear speed of the wires from one to another of two different speeds by a speed changing device provided downstream of the twisting set, then passing the wires through one further set provided downstream of the plurality of sets; the speed changing device being provided downstream of the said one further set, and winding the twisted wires on a winding device, the wires being passed in a bundle to a winding device through the first fixed head, first twisting head, the storing means, the second twisting head of each set, the speed changing device, a capstan and the winding device in this order.

4. Apparatus for making S–Z alternately twisted wires comprising two spaced fixed heads, a cradle supported between the two fixed heads, two spaced twisting heads carried by said cradle, the distance between the two twisting heads providing a storing length, means for supplying individual wires to the fixed head upstream of the cradle and through the two twisting heads and the fixed head downstream of the cradle, a capstan for moving the wires through the fixed and twisting heads at a predetermined linear speed, a speed changing device between the downstream fixed head and the capstan and a second speed changing device is provided upstream of the upstream fixed head to change the linear speed of the wires to a second predetermined speed, and means for rotating the cradle continuously in one direction only at a given speed.

5. Apparatus according to claim 4, wherein a second speed changing device is provided upstream of the upstream fixed head.

6. A method of producing alternate S and Z twists in a group of wires comprising the steps of passing the wires through a plurality of twisting sets, each set consisting of two spaced fixed heads and two twisting heads arranged between the two fixed heads, each adjacent a respective one of the two fixed heads; the sets being arranged serially and in the relationship that a second fixed head of one set is adjacent to a first fixed head of the succeeding set, rotating the twisting heads of one set in one direction at a constant speed and the twisting heads of the succeeding set in an opposite direction at a constant speed, the wires being first passed in a bundle through the first fixed head, first twisting head, second twisting head and second fixed head of the first set and then through the next set, and periodically changing the linear speed of the wires from one to the other of two different speeds each time the wires advance by a storing length equal to the distance between a point intermediate of the first fixed head and the first twisting head and a point intermediate of the second twisting head and the second fixed head divided by an odd number, the storing length of the strands in each set being equal.

7. A method of producing alternate S and Z twists in a group of wires comprising the steps of passing the wires through a plurality of twisting sets, each set consisting of two twisting heads arranged in series between two fixed heads, the first fixed head and the first twisting head of the first set, the second twisting head of each set and the first twisting head of each succeeding set, the second twisting head of the last set and the second fixed head being respectively arranged adjacent to each other, rotating the two twisting heads of each set at the same speed, the rotational direction of two twisting heads of one set being in the opposite direction to the rotational direction of those of the succeeding set, the wires being passed in a bundle through respective heads such that the strands advance in the order of the first fixed head, first and second twisting heads of each set and the second fixed head, and periodically changing the linear speed of the wires from one to another of two different speeds each time the wires advance by a storing length equal to the distance between the first and second twisting head of each set divided by an odd number, the storing length in each set being equal.

8. Apparatus for making S–Z alternately twisted wires, comprising two pairs of spaced fixed heads, a cradle supported between each pair of fixed heads, two spaced twisting heads carried by each cradle, the distance between the two twisting heads of each cradle providing equal storing lengths, means for supplying individual wires to the first fixed head upstream of the first cradle and through the two twisting heads and the fixed head downstream of the first cradle and thence through the second pair of fixed heads and twisting heads of the second cradle, a capstan for moving the wires through the fixed and twisting heads at a predetermined linear speed, a speed changing device between the downstream fixed head and the capstan to change the linear speed of the wires to a second predetermined speed each time the wires advance a storing length, and means for rotating each cradle continuously in one direction at a constant speed, the cradles being rotated in opposite directions.

9. Apparatus according to claim 8, wherein a second speed changing device is provided downstream of the first fixed head.

10. Apparatus for making S–Z alternately twisted wires comprising a pair of spaced fixed heads, two cradles each supporting a pair of spaced twisting heads in seriatim, the distance between the two twisting heads of each cradle providing equal storing lengths, means for supplying individual wires to the first fixed head upstream of the first cradle and through the two twisting heads and thence through the twisting heads of the second cradle and second fixed head, a capstan for moving the wires through the fixed and twisting heads at a predetermined linear speed, a speed changing device between the downstream fixed head and the capstan to change the linear speed of the wires to a second predetermined speed each time a given storing length of wire is advanced, and means for rotating each cradle continuously in one direction at a constant speed, the cradles being rotated in opposite directions.

11. Apparatus according to claim 10, wherein a second speed changing device is provided upstream of the other fixed head.

References Cited

UNITED STATES PATENTS

| | | | |
|---|---|---|---|
| 1,960,426 | 5/1934 | Zundorf | 57—34 |
| 2,593,984 | 4/1952 | Clary et al. | 57—58.55 |
| 2,882,677 | 4/1959 | Davey | 57—156 |
| 2,869,316 | 1/1959 | Lilly | 57—64 XR |
| 2,971,709 | 2/1961 | Ellis | 242—25 |
| 2,985,994 | 5/1961 | Menke et al. | 57—58.52 |
| 3,025,656 | 3/1962 | Cook | 57—64 |
| 3,271,941 | 9/1966 | Haugwitz | 57—15 |
| 3,320,350 | 5/1967 | Corrall et al. | 57—64 XR |
| 3,373,550 | 3/1968 | Symonds | 57—34 |
| 3,373,549 | 3/1968 | Shaw | 57—34 |

STANLEY N. GILREATH, Primary Examiner

W. H. SCHROEDER, Assistant Examiner

U.S. Cl. X.R.

57—59, 91, 156